United States Patent [19]

Ashton et al.

[11] 4,247,751

[45] Jan. 27, 1981

[54] AUTOMATIC PRESETTABLE WELDING SYSTEM

[75] Inventors: Theodore Ashton, Lyndhurst; William E. Klinger, Lakewood; Ralph M. Samodell, Cleveland Heights, all of Ohio

[73] Assignee: The Lincoln Electric Company, Cleveland, Ohio

[21] Appl. No.: 937,124

[22] Filed: Aug. 28, 1978

[51] Int. Cl.$^3$ .............................................. B23K 9/10
[52] U.S. Cl. ........................... 219/130.31; 219/137.71
[58] Field of Search ........... 219/130.1, 130.21, 130.31, 219/130.32, 130.33, 137.71; 318/565; 361/42, 47, 48, 49, 50

[56] References Cited

U.S. PATENT DOCUMENTS

| | | | |
|---|---|---|---|
| 2,617,913 | 11/1952 | Oestreicher | 219/130.32 |
| 3,133,225 | 5/1964 | Lobosco et al. | 219/137.71 |
| 3,304,485 | 2/1967 | Manz | 219/130.1 |
| 3,968,340 | 7/1976 | Fernicola | 219/130.31 |
| 4,030,012 | 6/1977 | Buhler | 318/565 |
| 4,071,885 | 1/1978 | Bilczo et al. | 219/130.33 |
| 4,115,829 | 9/1978 | Howell | 361/42 |

FOREIGN PATENT DOCUMENTS

2528909  1/1977  Fed. Rep. of Germany ........ 219/130.1

OTHER PUBLICATIONS

"Operating Manual For Lincoln LN-8 Squirt Welders", Jun. 1975.
E. P. Vilkas, "New Developments in Gas Metal-Arc Welding Control Systems", *Welding Journal*, Oct. 1965, p. 840.

*Primary Examiner*—Elliot A. Goldberg
*Assistant Examiner*—Clifford C. Shaw
*Attorney, Agent, or Firm*—Meyer, Tilberry & Body

[57] ABSTRACT

An automatic presettable welding system which enables the user to preset the arc voltage and wire feed speed to precise predetermined values without either energizing the wire with arc voltage or initiating the wire feed. A meter is supplied with an appropriate signal so the readout corresponds to the desired wire feed speed or the desired arc voltage and these same signals are supplied to wire feed speed or arc voltage comparative circuits which then function to energize a wire feed motor or an arc welding power source to the precise wire feed speed or arc voltage indicated on the meter. Means are provided for controlling the acceleration of the wire feed drive motor and a controlled initiation of the arc voltage at the beginning of each weld. Overload, over-voltage and under-voltage or over or under wire feed speed and other protective circuits are provided with appropriate delays in the functioning thereof to insure fully automatic and satisfactory welding.

14 Claims, 8 Drawing Figures

AUTOMATIC PRESETTABLE WELDING SYSTEM

This invention pertains to the art of electric arc welding and, more particularly, to an electric arc welding system wherein the wire feed speed and arc voltage may be preset to precise values and the welding operation entirely controlled from a remotely located welding station.

The invention is particularly applicable to a semiautomatic welder wherein the electrode wire is fed through a cable to a hand-held welding gun on which the start and stop controls are located and will be described with particular reference thereto, although it will be appreciated that the invention is equally applicable to fully automatic welding and may be used with either: open arc welding using solid or cored type electrodes, using self shielding or gas shielding, or submerged arc welding using granular flux.

In the art of electric arc welding, for a given electrode and a given workpiece there is usually an optimum arc voltage and an optimum wire feed speed which can be determined in laboratory experiments or on the job. Once these values are determined, it is desirable that they be maintained from weld to weld and that they be quickly resettable when shifting from one type of welding to another. Further, it is desirable that the supervisor can readily check to see that the proper welding conditions are being maintained from hour to hour and from day to day, this being particularly important in view of the tendency of many operators to vary the arc welding conditions to suit their particular desire or possibly to slow down or alter the welding process. Heretofore, unless the welder was in fact welding, it was difficult for the supervisor to ascertain that the prescribed welding conditions were being adhered to by the operator.

Heretofore, it has been known to provide welders with a pair of control knobs, one for the wire feed speed and one for the arc voltage, which knobs had pointers thereon reading against a calibrated scale on the control housing. These knobs adjusted high precision, sometimes linear, potentiometers which, if accurately calibrated, provided reference voltages which would in turn determine the wire feed speed and arc voltage when the welder was turned on. One of the problems with such an arrangement is that the potentiometers had to be of a high precision type. Further, unless the scale against which knobs of the potentiometer operated was very large, it was difficult to accurately preset the wire feed speed or arc voltage to precise limits. Also, as the potentiometers aged or other elements in the control system changed, the actual wire feed speed or arc voltage would change from that preset on the control knobs.

A further consideration was that, in many applications, it was desirable to use different preset procedures, either during the weld or from weld to weld. These are used to give the operator control of bead size or penetration depending on joint conditions. To do this with the prior art equipment required a multiplicity of these high precision potentiometers.

Further, in automatic welding it is desirable that the controls monitor the various things which can go wrong and provide means for shutting down the welder in case the procedure is not accurately held.

The present invention contemplates a new and improved arc welding control system which overcomes all of the above referred to difficulties and others and provides an arc welding control system wherein: the wire feed speed can be easily and accurately preset; the arc voltage can be easily and accurately preset; and when the arc welder is started, the user can be assured that the preset welding conditions will prevail within the inherent tolerances of the system.

In accordance with the present invention, an arc welding system is provided comprised of: a meter; means for selectively supplying such meter with an adjustable signal equal to or in proportional relationship to the desired wire feed speed or the desired arc voltage, while at the same time supplying proportional signals to other circuits for comparison; means for selectively supplying such meter with a signal equal to or in proportional relationship to the actual wire feed speed or the actual arc voltage while at the same time supplying proportional signals to other circuits for comparison; means for continuously comparing such desired wire feed speed signals to such actual wire feed speed signals and energizing the wire feed drive motor such that the two signals are precisely equal; means for continuously comparing such desired arc voltage signals to such actual arc voltage signals, such comparing means having an output controlling an associated power source so that the two signals are precisely equal; and means for adjusting such desired signals between preselected limits.

Further in accordance with the invention, means are provided for controlling the acceleration of the wire feed drive motor from zero speed to the desired preset value as well as carefully controlling the electrode voltage as it changes from its initial value to its preset value upon initiation of a weld cycle.

Further in accordance with the invention, the control circuit contains means for providing an essentially constant time period for the acceleration of the wire feed drive motor for all preset drive speeds.

Further in accordance with the invention, means are provided for sensing whether the actual arc voltage is either too high or too low compared to the desired arc voltage and in such event, after a predetermined time delay, shutting down the welding system.

Further in accordance with the invention, similar means are provided for sensing whether the actual wire feed speed is either too high or too low compared to the desired wire feed speed and in such event, after a predetermined time delay, shutting down the welding system.

Further in accordance with the invention, means are provided for preventing the grounding lead in the cable providing operating power to the wire feed motor control from being damaged in the event that welding current passes through this lead.

Further in accordance with the invention, means are provided to shut down the system in the event that the voltage sensing lead to the workpiece should become accidentally or intentionally disconnected from the workpiece.

The principal object of the invention is the provision of a new and improved welding system wherein the wire feed speed and arc voltage may be accurately preset, using a meter prior to starting of the welding system.

Another object of the invention is the provision of a new and improved arrangement for enabling the presetting of the wire feed speed or arc voltage of an electric arc welding system wherein one or more conventional low-precision potentiometers may be employed throughout while still obtaining precise control over the arc welding operation.

Another object of the invention is the provision of a new and improved arc welding system wherein the acceleration of the wire feed drive motor to its preset value is controlled to provide improved arc starting characteristics.

Another object of the invention is the provision of a new and improved arrangement for controlling the electrode voltage as it changes from its initial value to its preset value to improve arc starting characteristics.

Another object of the invention is the provision of a new and improved arc welding system wherein the same meter may be employed for indicating arc voltage or wire feed speed.

Another object of the invention is the provision of a new and improved arc welding system wherein it is possible to preset the wire feed speed and arc voltage to precise predetermined values without drawing a welding arc or feeding the electrode.

Another object of the invention is the provision of a new and improved arrangement whereby the wire feed speed and arc voltage may be accurately preset using a meter without drawing a welding arc or feeding the electrode and the same meter may be employed to check the actual welding conditions after the welding arc is started.

Another object of the invention is the provision of a new and improved arc welding system wherein a single meter may be employed to indicate the preset or actual wire feed speed and the preset or actual arc welding voltage.

Another object of the invention is the provision of a new and improved control for a semi-automatic arc welding system having a grounding lead in its supply power cable wherein improved means are provided for shutting down the system in the event of excessive currents in the grounding lead.

Another object of the invention is the provision of a new and improved arc welding system wherein means are provided for shutting down the welding system after a predetermined period of time in the event that the power source is incapable of supplying or fails to supply a voltage equal to that selected by the operator.

Another object of the invention is the provision of a new and improved arc welding system wherein means are provided for shutting down the welding system after a predetermined period of time in the event that the wire feeder is incapable of feeding or fails to feed wire at the rate selected by the operator.

Another object of the invention is the provision of a new and improved wholly automatic wire feed for an arc welder wherein means are provided for controlling the rate of acceleration of the wire feed motor to a preset value.

The terms "electrode" and "welding wire" are used interchangably in the specification to describe consumable metallic member which carries current and deposits metal at the weld point in the welding process.

The invention may take physical form in certain parts and arrangements of parts, a preferred embodiment of which will be described in detail in this specification and illustrated in the accompanying drawings which form a part thereof and wherein:

FIG. 13 is a schematic of the wire feed motor control circuit;

Figure 1:
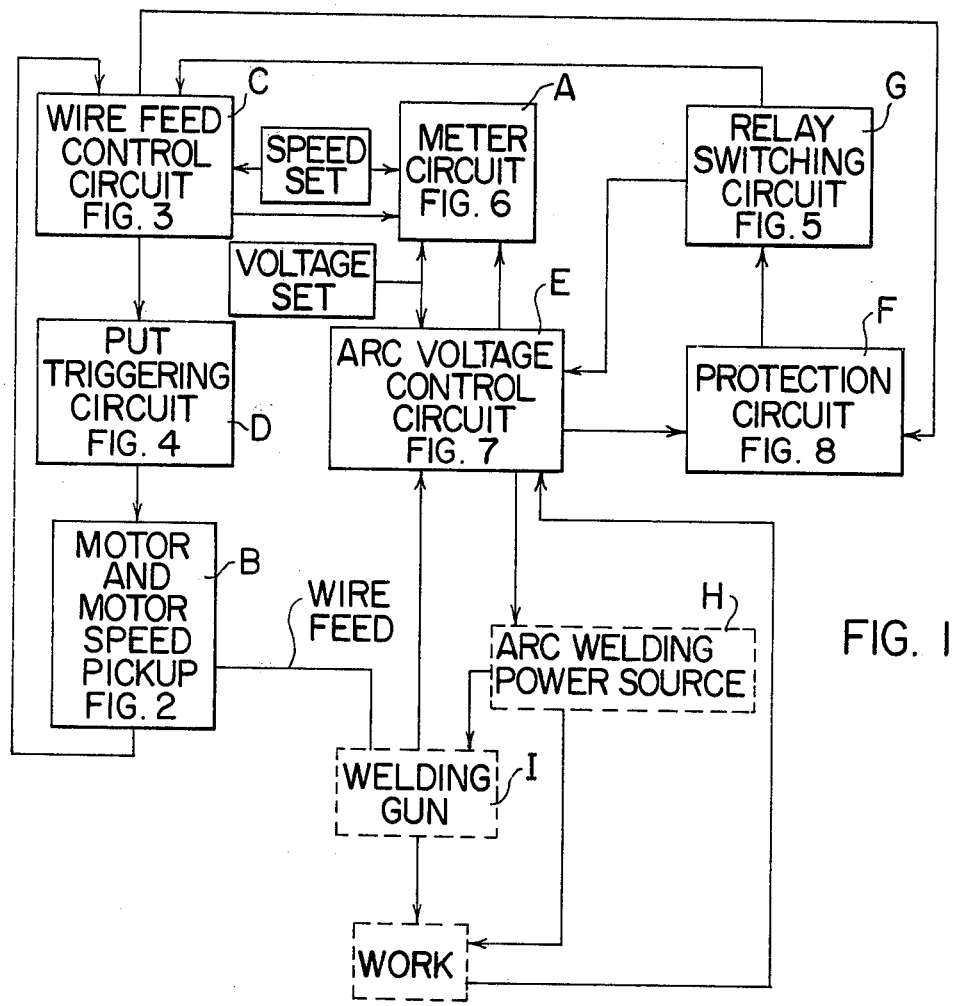
FIG. 1 is a block diagram showing the general interrelationship of the specific circuits of a preferred embodiment of the invention.

Referring now to the drawings wherein the showings are for the purpose of illustrating the preferred embodiment of the invention only and not for the purpose of limiting same, FIG. 1 shows a meter circuit A which presents the preset or actual wire feed speed or the preset or actual arc voltage. Additionally, FIG. 1 shows a wire feed speed pickup circuit B, which provides a series of voltage pulses having a frequency proportional to the feed rate of the wire; this pulse output is applied to a wire feed motor control circuit C, which converts the pulses to a voltage proportional to the frequency of the pulses, compares it to a voltage corresponding to the wire speed preselected by the user and produces an output which is supplied to a programmable unijunction transistor triggering circuit D. The triggering of the programmable unijunction transistor controls the voltage to the wire feed motor by phase control of associated SCR's and thus the motor speed.

An arc voltage control circuit E measures the arc voltage and compares this value to the preset arc voltage selected by the user. The output of the voltage control circuit E controls the output voltage of an associated arc welding power source H.

A protection circuit F monitors the output voltage of the arc voltage control circuit E and shuts down the wire feed motor and stops welding operations when anomalous conditions are encountered.

A relay switching circuit G provides means by which welding is stopped by the protection circuit and also provides a trigger switch interlock circuit which allows the user to release the trigger switch on the welding gun I once welding operations are under way, and to continue welding without the need to continuously hold the trigger switch closed.

METER AND METER SWITCHING CIRCUIT

Figure 6:
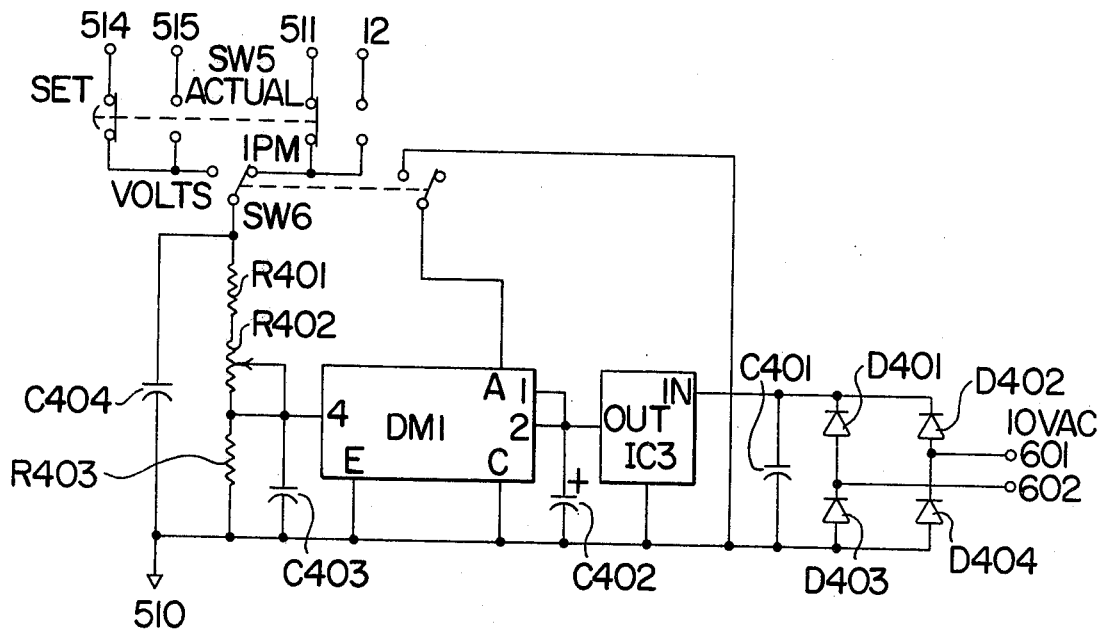
FIG. 6 is a schematic of the electrode voltage and wire feed speed meter, meter power supply, and meter switching circuit.

Importantly, arc voltage readings, arc voltage presettings, wire feed speed readings and wire feed speed presettings, are all read on a common or identical meter(s). Although only one meter and a switch to change from voltage to wire feed speed is shown in the preferred embodiment it may also be desirable to replace the switch with an automatic circuit to switch the meter so it will alternately display voltage and wire feed speed for selected short periods of time. Further it may be even more desirable to use separate meters for the voltage and wire feed speed displays. Preferably, a single integrated-circuit digital voltmeter DM1, reading from zero to 999, is used to display all parameters. While an analog meter could be used, the time required to read it is somewhat greater and the accuracy of readout is not quite as high. This voltmeter and its associated switching circuit and power supply are shown schematically in FIG. 6.

Power for this circuit is provided from transformer T1 through its 10 volt AC secondary winding at terminals 601 and 602. Diodes D401, D402, D403, D404 form a full-wave rectifier bridge producing direct current output. Capacitor C401 filters this output so that it is usable by integrated circuit IC3. IC3 provides +5 volt power of the required precision to the digital meter DM1. Capacitor C402 provides transient stability and R.F. noise immunity for this power supply. Pins C and E are connected to the zero reference terminal, 510, to provide a zero reference for the meter. A voltage divider network composed of resistors R401,R402,R403 attenuates the input signal voltages to bring them within the range of the digital voltmeter. R402 is adjustable to allow precise trimming of this attenuation. C404,C403 provide noise immunity for the input portion of the meter circuitry.

Two switches, SW5,SW6, are provided for selectively applying voltage signals representing the various circuit parameters to the voltage divider, so that the appropriate voltage is applied to the digital meter. Switch SW6 is a double-pole double-throw switch which connects the meter to read either VOLTS: meaning the actual arc voltage or preset arc voltage, or IPM: meaning actual or preset inches per minute of wire feed speed.

SW6 also grounds pin A of DM1 in the VOLTS position. This adds a decimal point to the meter so that it reads from 00.0 to 99.9 volts.

Switch SW5 is a momentary switch. With this switch in the released position, the meter reads the set value of whichever parameter was selected with SW6. When this switch is depressed, the meter will read the actual value of the parameter selected.

Thus, when a value for one of the two basic parameters of the welding control system is being set into the circuit, the meter will instantaneously and continuously display the selected value being set as the appropriate potentiometer R2 or R3 (See FIGS. 3 & 7) is varied. Because the control potentiometer voltage and not the control potentiometer position is immediately apparent to the operator, non-precision potentiometers can be used. Further, if, due to contamination or aging, resistance values of the potentiometers change, the precision of the setting procedure will not be affected. The preset reference voltage itself is read and not a potentiometer position which could introduce error. Calibration or setting of the potentiometer arm to a dial scale is unnecessary. A switching network can easily be used to accomodate multiple non-precision potentiometers in place of R2 or R3. A number of different welding procedures can thus be incorporated in the system.

WIRE FEED MOTOR CIRCUIT

Figure 2:
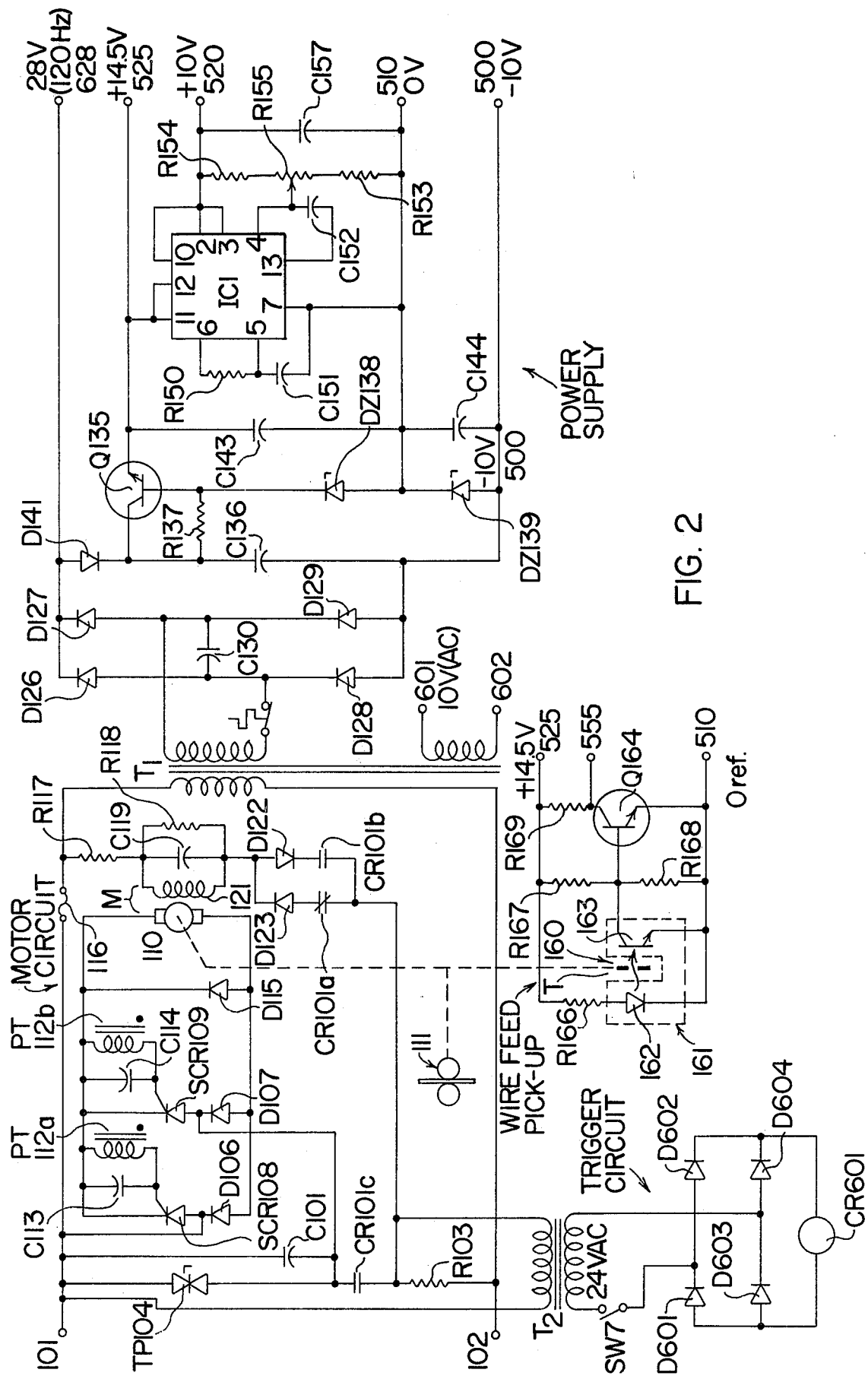
FIG. 2 is a schematic of the wire feed motor power circuit, the wire feed speed sensing circuit and the power supply circuit used in the preferred embodiment.

FIG. 2 shows the circuit for the wire feed motor M, the wire feed speed pickup, and power supply used in the preferred embodiment. The wire feed motor includes an armature 110 and a field 121 whose circuits are energized from 120 volts, 50 or 60 cycle, AC power supplied through terminals 101, 102. Resistor R103 acts as a current limiter, protecting the armature supply circuit. Metal-oxide varistor TP104 protects the circuit from transient over-voltages on the supply line and C101 filters out radio frequency noise on the supply line. Diodes D106, D107 and SCR's 108, 109 form a conventional full-wave rectified, SCR-controlled bridge supplying voltage to the armature, 110. Pulse transformer windings PT112a, PT112b pulse the gates of SCR 108, SCR 109, respectively, as determined by the motor control circuit. Capacitors C113, C114 prevent high frequency noise from firing these SCR's. Diode D115 supplies a path for inductive freewheeling current and dynamic braking current of the motor when the armature 110 is deenergized and the field winding 121 polarity is reversed.

Field voltage is supplied to the wire feed motor field winding 121 through fuse 116, resistor R117, resistor R118, filter capacitor C119 and the contacts of control relay CR101. Under normal operating conditions, field winding 121 is supplied with half-wave rectified current through diode D122 and the normally open contact of control relay CR101. When control relay CR101 is not energized, reverse polarity voltage is supplied to the field winding 121 through diode D123 and the normally closed contact of control relay CR101.

The field winding 121 is always energized; the direction of motor rotation being controlled by the field polarity, and the motor speed by the energization of the armature 110.

POWER SUPPLY

Transformer T1 provides reduced voltages for the control circuitry. Ten volt AC power is supplied at terminals 601 and 602. The transformer also supplies 28-volt AC power to a full-wave rectifier comprised of diodes D126, D127, D128, D129. Capacitor C130 provides nose filtering of the rectifier bridge input. The output of this bridge circuit is a 28 volt, 120 Hz rectified current and is provided at terminal 628.

Transistor Q135 provides a nominal 14.5 volt DC output at terminal 525. Capacitor C136 filters the output of the full-wave rectifier bridge and provides a potential at the collector of transistor Q135 that is at least 16 volts, regardless of normal AC power line fluctuations. Resistor R137 and zener diodes DZ138 and DZ139 provide regulated biasing for the base of Q135. Terminal 510, between the two zener diodes DZ138 and DZ139, provides a zero-reference voltage level for the control circuitry. Still another output terminal 500, to which the anode of DZ139 is connected, provides a nominal minus 10 volt supply for the control circuitry. Diode D141 isolates the full-wave rectified output at terminal 628 from the DC potential on capacitor C136. Capacitor C143 filters the 14.5 volt output between terminals 525 and 510 and capacitor C144 filters the output between terminals 510 and 500.

A precisely regulated 10-volt source is needed to supply reference voltages for the wire feed motor control circuit C, and for the arc voltage control circuit E. This is provided by integrated circuit IC1. R150, C151, C152, R153, R154, R155 are connected to integrated circuit IC1 as is conventional to provide a precisely regulated 10-volt reference supply. C157 filters the output of this power supply to eliminate transient and noise voltages. The regulated output is available at terminals 520 and 510.

WIRE FEED SPEED PICKUP CIRCUIT

A precise voltage representation of wire feed speed is required to properly maintain such wire feed speed. This information is provided by a pickup circuit in the form of an optical pickup T mounted on the wire feed motor armature 110. This optical pickup consists of a light-emitting diode 162 and light-sensitive transistor 163 supplied in a single package 161. As a slotted disc 160 fixed to the motor shaft rotates, it interrupts the light path between light-emitting diode 162 and light-sensitive transistor 163. The light-sensitive transistor 163 converts these on-off light pulses into a train of voltage pulses, the frequency of which is proportional to the speed of rotation of the wire feed motor armature 110. This pulse train is supplied to the base of Q164 which amplifies and shapes it. The output of Q164 is supplied to terminal 555, which in turn is connected to the wire feed motor control circuit C. Resistor R166 limits the current to the light-emitting diode 162. Resistors R167, R168, R169 bias transistor Q164.

In some instances, measurement of wire speed is done directly by means of a wire speed pickup wheel 111 which rides directly on the electrode. The slotted disk 160 is coupled to the shaft supporting this wheel. This structure avoids any error due to slippage of the welding wire relative to the drive mechanism.

WIRE FEED MOTOR CONTROL CIRCUIT

Figure 3:
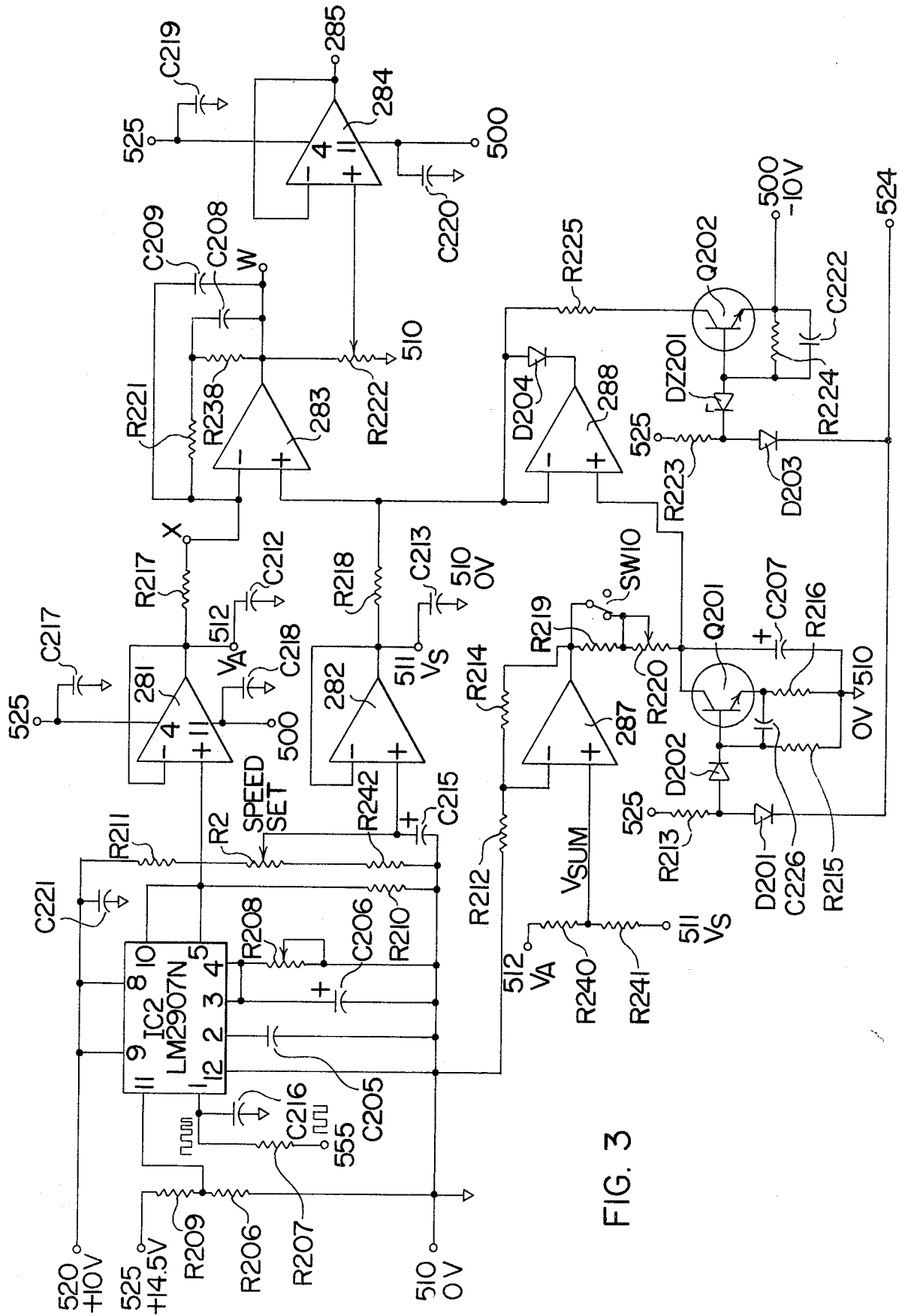

The wire feed motor control circuit C is shown in FIG. 3. This circuit compares a voltage proportional to the speed of the wire feed motor M to a voltage corresponding to the speed preselected by the user, and compensates for any discrepancies between the two by changing the conduction angle of SCR's 108, 109 (and thus the voltage to the wire feed motor armature 110) so that the voltages are equal and thus the speed of the wire feed motor will precisely equal the preset speed. Input to the control circuit is supplied at terminal 555, from the wire feed speed pickup circuit, and at potentiometer R2, where the user selects wire feed speed. R2, while shown as included in this control circuit, is actually located adjacent to the digital meter DM1 where it is readily accessible by the user.

The pulse train supplied by transistor Q164 through terminal 555 is applied through resistor R207 to pin 1 of integrated circuit IC2. IC2 is an LM2907N integrated circuit which performs the function of converting a pulse input to a voltage output proportional to the frequency of the pulse input. The output of IC2 is supplied at pin 5 and is connected to the input of operational amplifier 281. Capacitors C205,C206, and resistors R208, R210 are connected to the integrated circuit as is required to achieve the frequency-to-voltage conversion desired. Precision reference supply output 520 provides a precise 10-volt source at pins 8 and 9 of IC2. A 4.5 volt threshold level is set up at pin 11 through the voltage divider network comprised of R206,R209 connected to the 14.5 volt terminal 525 and the zero voltage reference terminal 510. Trimming rheostat R208 provides a means for adjusting the frequency-to-voltage conversion relationship of IC2 to the precise value required. In the present instance, R208 is trimmed so that IC2 can provide a 6 volt output, representing a wire feed speed of precisely 600 inches per minute, and 0.5 volt output representing a wire feed speed of precisely 50 inches per minute. The frequency-to-voltage conversion relationship between these values is linear. Obviously, other representative outputs for wire feed speeds could be trimmed. Actually, these voltages are selected so that, appropriately divided, the reading displayed on the digital meter will be in the desired lineal units, e.g. inches or millimeters per unit of time, e.g., minutes or seconds. Capacitors C216, C221 prevent high frequency noise and transients from affecting IC2.

The non-inverting input of operational amplifier 281 is connected to the output of IC2. The output of operational amplifier 281 is connected to terminal 512 and also connected back to the inverting input of the same operational amplifier. This provides a direct feedback path and causes operational amplifier 281 to act as a unity-gain amplifier. Its function is to act as a buffer, i.e., present a high impedance load to the output of IC2 while providing sufficient power at its output to drive the succeeding wire feed motor control circuitry.

Resistors R211, R242 and potentiometer R2 form a voltage divider between precision 10-volt reference supply terminal 520 and the zero volt reference terminal 510. The values of resistors R211, R242 are selected such that the voltage at the center terminal of potentiometer R2 can be varied between 0.5 volts and 6 volts, corresponding to wire feed speeds of 50 to 600 inches per minute. The wire feed speed is thus selected by changing the voltage on the center terminal of potentiometer R2. While the user is changing the center terminal potential, this potential, when appropriately divided, can be read on the digital meter DM1. Thus, the user is directly adjusting the set voltage, not an intermediate resistance value, as is conventional, and the readout is in the actual wire feed speed in IPM or mm/sec.

Different potentiometers could be connected in place of R2 by means of a switching network. A number of different procedures could then be selected by the user by simply switching to the appropriate potentiometer.

Capacitor C215 is connected between zero reference terminal 510 and the center terminal of potentiometer R2 and functions to provide noise immunity as well as to slow the response time to fast changes in the speed setting. The center terminal of potentiometer R2 is also connected to the non-inverting input of operational amplifier 282. The output of amplifier 282 is connected to terminal 511 and back to the inverting input of the same operational amplifier. Operational amplifier 282 functions as a unity gain amplifier to provide a very high impedance load on voltage divider R211, R2, R242, and to supply the required current for the remaining portion of the motor control circuit.

The voltage at terminal 512 ($V_A$) is thus precisely proportional to the actual electrode wire feed speed, while the voltage at terminal 511 ($V_S$) is precisely proportional to the wire feed speed preselected by adjusting R2. These two voltages are fed through resistors R217, R218 to operational amplifier 283. $V_A$ is connected to the inverting input of operational amplifier 283 and $V_S$ is connected to the non-inverting input of operational amplifier 283. The output of operational amplifier 283 is connected through a feedback circuit comprised of R221, R238, C208, C209 back to the inverting input.

The gain of operational amplifier state 283 is, in this instance, governed by the ratio of the impedance of the feedback path to the impedance in the inverting input. The feedback network associated with operational amplifier 283 provides different gains for different types of signals. Input resistor R217 presents a constant impedance to all signals encountered. For rapid changes in the input signal, feedback occurs primarily through resistor R221 and capacitor C208. Therefore, the gain of the amplifier for rapid variations in input signal is essentially R221 divided by R217. For inputs of a lower frequency, the feedback signal will not be shunted effectively by capacitor C208. Therefore, the feedback resistance is essentially the sum of R238, R221. The gain of the amplifier is, therefore, much higher for low frequency signals than for high freuency signals. Thus, the motor speed control circuit will precisely correct long-term differences in speed but will tend to ignore rapid fluctuations in speed such as small-amplitude motor oscillations. C209 provides a low-impedance shunt in the feedback circuit for high frequency noise, thereby minimizing the effects of noise on the control circuit.

A loop jumper connecting terminal W to X provides for a very low-impedance path between the output and the inverting input of operational amplifier 283. This removes the $V_A$ signal from the control circuit for initial open-loop trimming of the wire feed system without feedback. This jumper is subsequently removed and the feedback reinstated.

The output of operational amplifier 283 is connected to one end terminal of potentiometer R222, the other of which is connected to the zero reference Terminal 510. The center terminal of potentiometer R222 is connected to the non-inverting input of operational amplifier 284 which operates as a unity-gain amplifier. The potentiometer is used to open-loop trim the high-speed operating point of the wire feeder. Again, capacitors C219, C220 provide noise immunity for the operational amplifier. The output of the wire feed motor control circuit appears at Terminal 285.

THE ACCELERATION CIRCUIT

The acceleration circuit provides means for controlling the acceleration of the wire feed speed at the beginning of a weld to improve the arc starting characteristics over that obtained if the acceleration were limited only by the starting characteristics of the motor and the inertia of the drive rolls and associated parts. Thus, at the start of welding the wire feed speed is zero, and $V_A$, the control signal proportional to wire speed, is also zero. $V_S$, the control signal proportional to the wire feed speed selected by the user, will be substantially higher than $V_A$. In the circuit thus far described, this would result in immediate, full energization of the motor M and a high acceleration rate up to the selected wire feed speed. The acceleration circuit is provided to bring the wire feed speed from zero to the selected value in a predetermined manner which optimizes the starting of the welding arc.

$V_A$ and $V_S$ at terminals 512 and 511 are supplied to resistors R240 and R241. These two resistors act as a weighted adder producing an output, Vsum, dependent on the values of $V_A$ and $V_S$. The values of R240 and R241 in the preferred embodiment are selected such that:

$$Vsum = 0.13 V_S + 0.87 V_A$$

Obviously, other ratios may be employed within the scope of the invention.

Vsum is applied to the non-inverting input of operational amplifier 287. Resistors R212 and R214 are connected between the output of the operational amplifier, its inverting input and the zero reference terminal 510, such that operational amplifier 287 operates as a "times-two" multiplier. The output of 287 is fed through resistor R219 and potentiometer R220 to capacitor C207, which is initially clamped. C207 charges to twice Vsum at a rate determined by the resistance of R219, R220 and the capacitance of C207. Switch SW10 is provided which, when closed, will short out R219 and speed the charging of C207, thus reducing the time period for motor M to reach its full preset speed.

The positive terminal of C207 is connected to the non-inverting input of operational amplifier 288. The output of operational amplifier 288 is connected through diode D204 to its inverting input and the non-inverting input of operational amplifier 283 (which under steady state conditions compares $V_A$ to $V_S$). In this configuration, operational amplifier 288 will force the voltage at its inverting input to follow the voltage at its non-inverting input as long as the non-inverting input is at a lower voltage than the inverting input. Therefore, during the starting sequence, the non-inverting input of operational amplifier 283 will follow the voltage at the positive terminal of C207, not $V_S$. The voltage difference between $V_S$ and the voltage at the output of operational amplifier 288 will result in a current through R218 large enough to compensate for this voltage difference.

As the voltage at the positive terminal of C207 nearly equals and begins to exceed $V_S$, diode D204 will become reverse biased. This will prevent feedback current from flowing to the inverting input of operational amplifier 288 and effectively removes operational amplifier 288 from the input of operational amplifier 283, allowing $V_S$ to be applied to the non-inverting input of 283.

The "times-two" multiplier resulting from operational amplifier 287 is used in supplying C207 to always maintain the capacitor charging current in the portion of its charging curve which is most nearly linear. This results in an acceleration characteristic which is dependent on Vsum. In the present instance, Vsum is primarily dependent on the actual wire feed speed as represented by $V_A$. This results in an initial slow rate of acceleration followed by a more rapid acceleration to the selected speed. This type of acceleration has been found most advantageous in striking the arc.

Further, this acceleration circuit results in an essentially constant time period of acceleration from start to the selected speed, regardless of the final speed selected. This has been found to be most advantageous in striking the arc at all speeds.

Transistors Q201, Q202 are associated with the wire feed shut-off circuitry. Initially, Q201 clamps the charge of C207 to a value determined by the initial voltage of R216, and Q202 clamps the non-inverting input of operational amplifier 288 to a value lower than zero reference terminal 510, until switching circuit G turns Q201 and Q202 off, which initiates the acceleration circuit.

THE PROGRAMMABLE UNIJUNCTION TRANSISTOR TRIGGERING CIRCUIT

Figure 4:
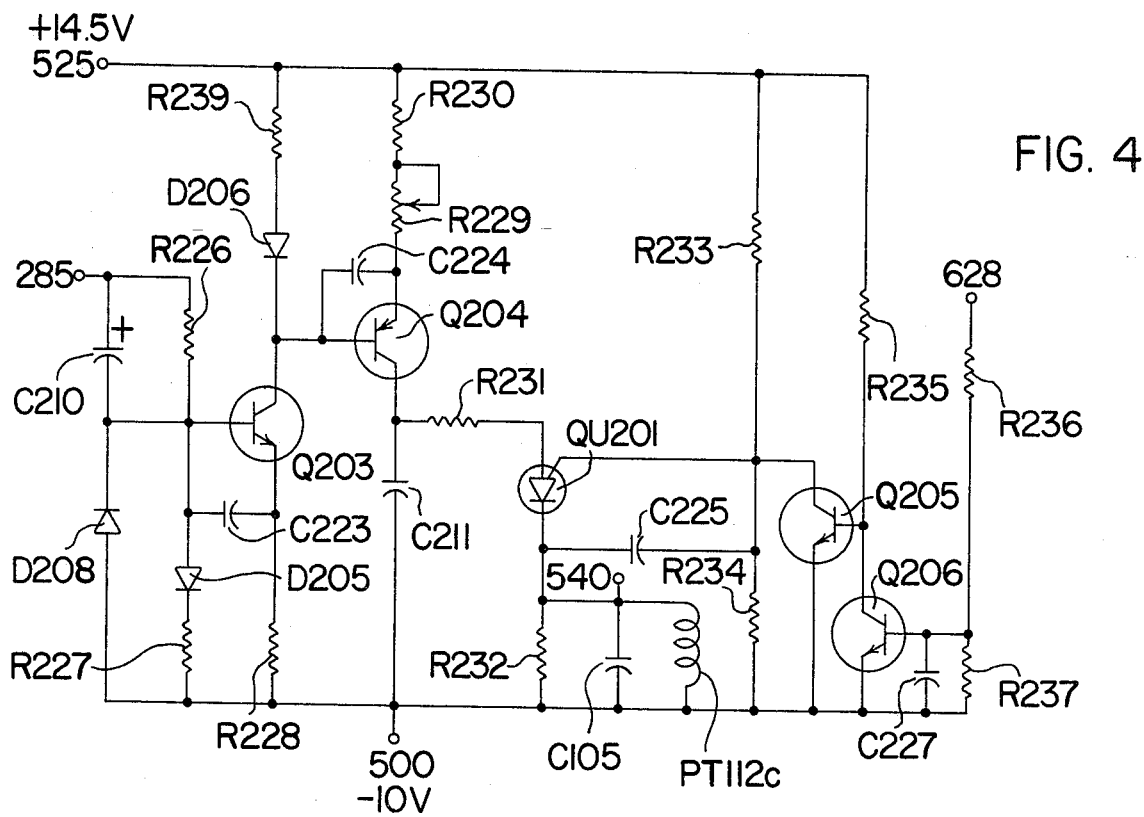
FIG. 4 is a schematic of the programmable unijunction transistor triggering circuit which controls the SCR's in the wire feed motor power supply.

The output of the wire feed motor control circuit C at terminal 285 is applied to a voltage divider composed of R226, diode D205, and R227, shown in FIG. 4. The base of transistor Q203 is connected to the voltage divider between R226 and diode D205. Capacitor C210 is connected in parallel with R226. The output of the wire feed motor control circuit C is applied through the voltage divider circuit to the base of transistor Q203, forward biasing its base-emitter junction. The current through the collector of Q203 is proportional to the voltage applied to its base. Q203 is in series with resistor R239, diode D206 and resistor R228, from terminal 525 to terminal 500. The base of transistor Q204 is connected to the cathode of diode D206 and the collector of Q203. This results in the collector current of Q204 being directly proportional to the output voltage of the wire feed motor control circuit C.

Q204 is in turn in series with resistor R230, variable resistor R229, and capacitor C211, from 525 to 500. The junction of C211 and the emitter of Q204 is connected through resistor R231 to the anode of QU201, the cathode of which connects to the −10 volt terminal through R232, C105 and PT 112c, all in parallel.

The gate of QU201 is connected to the junction of resistors R233 and R234, in series between lines 525 and 500, to set up a threshold level for programmable unijunction transistor QU201. The current through the collector of Q204 charges capacitor C211 until the threshold voltage of programmable unijunction transistor QU201 is reached. At this time, capacitor 211 will discharge through R231, QU201 (which will then conduct), R232, C105 and the primary winding of pulse transformer PT112c, pulsing the gates of SCR108 and SCR109. Either SCR108 or SCR109 will be forward biased, depending on the polarity of the AC power line at that moment, and will conduct when triggered, energizing the armature 110 of wire feed motor M.

Capacitor C210, connected in parallel with resistor R226, will cause an exaggerated response at the base of Q203 to any extremely rapid, large changes in the value of the wire feed control circuit output. An instantaneous change in the voltage of terminal 285 will cause an instantaneous change of the same magnitude on the base of Q203. Since the voltage at 285 is normally attenuated before application to Q203, this instantaneous change is larger than what would be normally applied for the same change occurring over a longer period of time. Thus, the response of the circuit to large, rapid variations of input signal at 285 will be increased.

Diode D208 protects the base-emitter junction of transistor Q203 from damage due to reverse biasing.

Capacitors C223, C224, C225 provide transient protection for the active devices in the triggering circuit. R228, R239 with Q203 set up the bias of the constant current charging transistor circuit of Q204. D205 and D206 provide voltage drops in their respective voltage divider circuits which compensate for the base-emitter junction voltage drops of transistors Q203, Q204, providing a more linear and temperature-stable current source. Resistor R230 and potentiometer R229 set the current through the collector of Q204 and timing capacitor C211. Potentiometer R229 is used in practice to set the low speed, open-loop operating point for the wire feed control.

In order for the firing circuit to more uniformly trigger the SCR's at the proper time in each cycle, timing capacitor C211 should be discharged to the same level at the beginning of each cycle. This is accomplished by transistors Q205 and Q206 being biased by the full-wave rectified 628 signal. At the end of each half-cycle of the AC power supply, terminal 628 goes to a low voltage. This turns Q206 off and Q205 on. The gate of QU201 is lowered by Q205 to nearly −10 volts, which causes QU201 to become conductive. Therefore C211 will discharge through R231, QU201, R232, C105, and PT112c, and be reset for the next SCR firing cycle.

THE RELAY SWITCHING CIRCUIT AND THE TRIGGER CIRCUIT

In welders wherein wire is automatically fed to the welding gun it is customary to provide an isolated trigger control switch on the gun to start and stop the welding. The trigger circuit (FIG. 2) is composed of transformer T2, diodes D601, D602, D603, D604, control relay CR601, and switch SW7. Switch SW7 is a normally open, momentary trigger-type switch mounted on the welding gun (not shown). When SW7 is closed, AC power from transformer T2 is supplied to the full wave rectifier bridge formed by the four diodes, and DC power from the bridge energizes the winding of the control relay, CR601.

Figure 5:
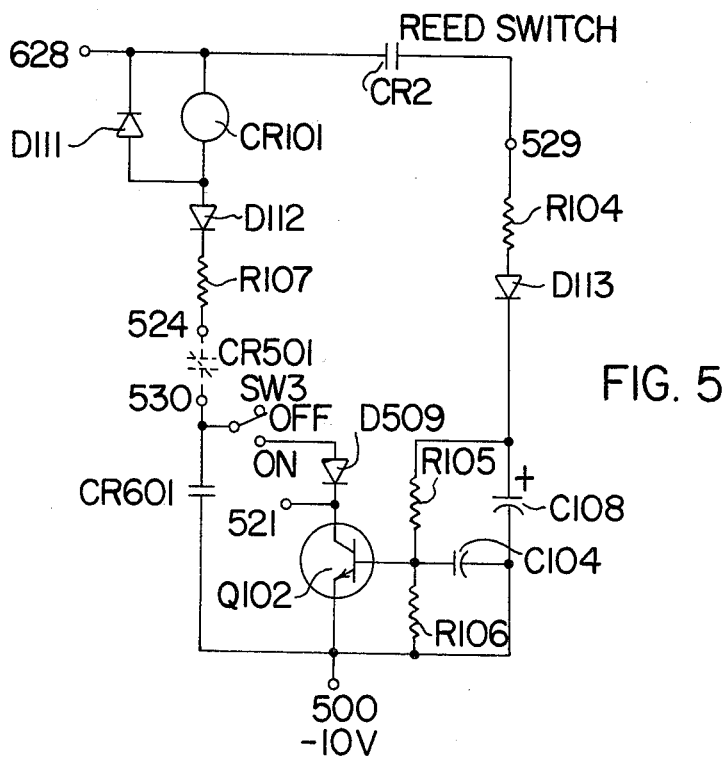
FIG. 5 is a schematic of the relay switching circuit.

The contacts of control relay CR601 appear in the relay switching circuit shown schematically in FIG. 5. With the coil of control relay CR601 energized, the CR601 contacts close. Current can then flow from power supply terminal 628, through control relay coil CR101, diode D112, resistor R107, normally closed control relay contacts CR501 and the now-closed control relay contact of CR601 to the −10 volt terminal, 500. This will connect terminal 524 to terminal 500 and enable the wire feed motor control circuit C, to energize the wire feed motor M.

Control relay CR101 fulfills three functions in the present circuit. Contacts CR101a, CR101b making up one pole of the relay, control the field current in the wire feed motor. With the winding of CR101 energized, contact CR101a is open, contact CR101b is closed, and forward voltage is provided to field winding 121 to advance the electrode. When the winding of CR101 is de-energized, CR101a is closed and CR101b is opened. Reverse polarity voltage is supplied to field winding 121 which, together with diode D115 in the armature circuit, provides dynamic braking.

A second normally open contact pole CR101c assures there will be no current to armature 110 of the wire feed motor M, if the welding systems is not operating. A third contact pole (not shown), controlled by this same winding is also provided. The normally open contacts of this pole are made available for external use to de-energized output from the welding power source H when the wire feed motor is stopped.

Diode D112 prevents current from flowing from the control circuit back to the 628 bus. Diode D111 provides a discharge path for inductive currents in the CR101 control winding. This prevents the generation of high-voltage transients when either CR601 or CR501 contacts open.

An interlock mechanism is also provided in the relay switching circuit. This allows the release of trigger switch SW7 during welding operations. Current reed switch CR2 magnetically senses current in the welding cable when the arc is established. Switch CR2 closes, allowing current from power supply terminal 628 to pass through resistor R104 and diode D113, to charge capacitor C108 and supply current to the base of Q102 through the voltage divider network of R105 and R106. As power supply terminal 628 provides a 120 Hz rectified (but unfiltered) current, filtering by C108 is necessary to maintain Q102 forward biased at all times and offer a short delay after CR2 opens. C104 is provided for transient protection. With Q102 conducting and switch SW3 in the on position, a current path is provided in parallel with contact CR601. The trigger can therefore be released without interrupting power to the control circuitry, once welding current has been established.

To stop the wire feed motor M, when using the interlock mode, the gun is pulled away from the work, breaking the arc. This will cause weld current switch CR2 to open, turning off Q102 which de-energizes CR101 and turns Q201 and Q202 on, thereby stopping the wire feed motor and resetting the acceleration circuit.

THE VOLTAGE CONTROL CIRCUIT

Figure 7:
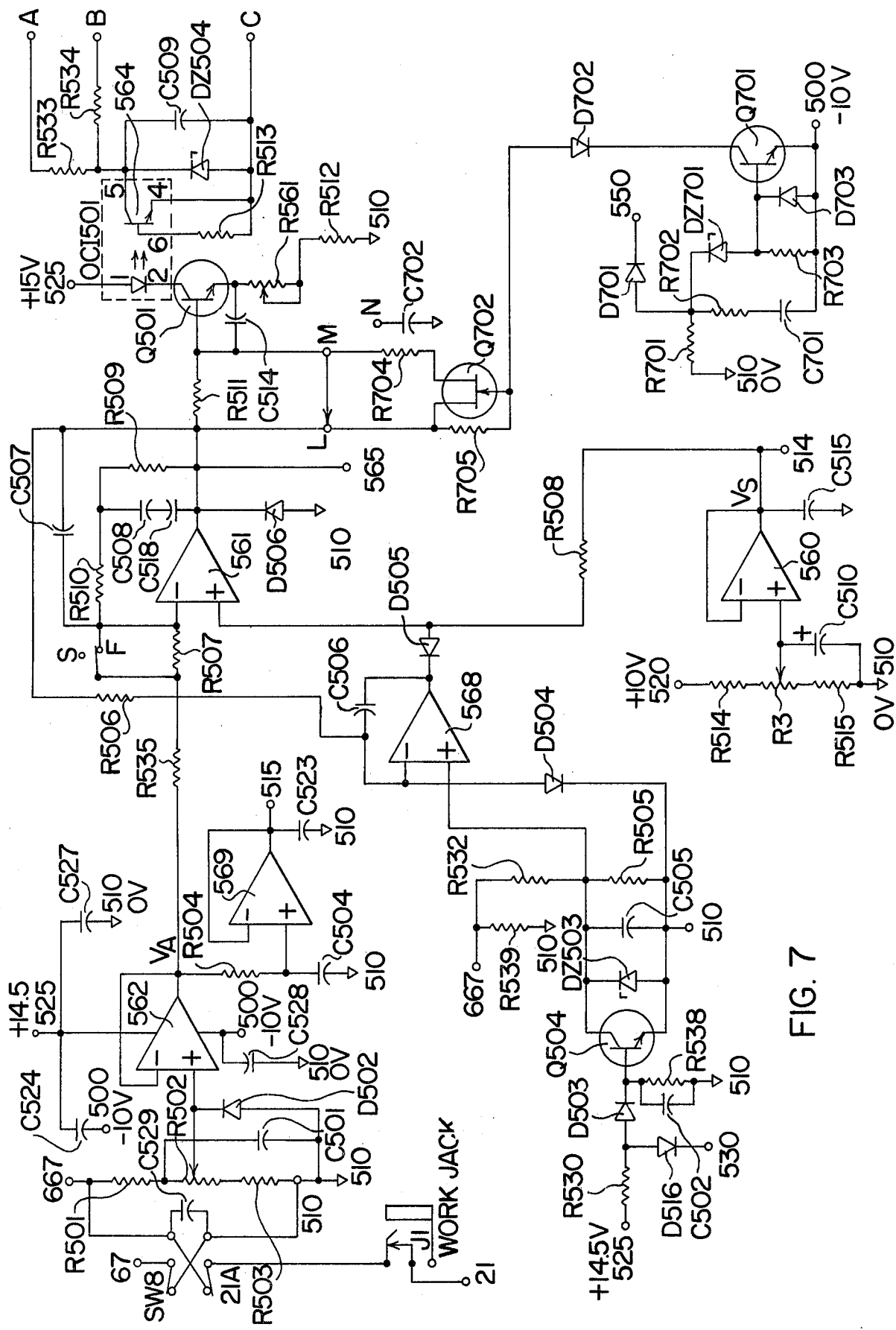
FIG. 7 is a schematic of the control circuit for controlling the output voltage of an associated welding power supply.

FIG. 7 shows schematically the arc voltage control circuit. This circuit is similar in design to the wire feed motor control circuit of FIG. 3. The circuit is provided with two inputs, the set voltage selected by the user ($V_S$) and the actual arc voltage ($V_A$). The set voltage is adjusted by the use of potentiometer R3, forming the center resistor of a three-resistor voltage divider composed of R514, R3, R515. This potentiometer is normally located adjacent the digital voltmeter DM1 where it is readily accessible to the user. As with R2 in the wire feed control circuit, multiple potentiometers can easily be substituted for the single potentiometer R3 with an appropriate switching network. The voltage divider is connected between the precision 10 volt terminal 520 and the zero reference terminal 510. Capacitor C510 is connected between the center terminal of potentiometer R3 and the zero reference terminal 510 to filter the signal.

The voltage signal developed at the center terminal of R3 is delivered to the non-inverting input of operational amplifier 560 which operates as a unity gain, high input-impedance buffer. Capacitor C515 is connected between the output of this operational amplifier and the zero reference terminal 510 to provide noise immunity to the operational amplifier circuit. The output of operational amplifier 560 is connected to terminal 514 which is in turn connected to the meter switching circuit, to allow direct readings of the arc voltage selected by the user.

In the present instance, resistors R514, R3, and R515 are selected such that $V_S$ can vary between 1.2 and 6.0 volts. By locating the decimal point between the tens and units digits this will be read at the three-digit meter display as a variation between 12.0 volts and 60.0 volts, which is the desired range for the arc voltage.

$V_S$ is also applied through resistor 508 to the non-inverting input of operational amplifier 561. A signal proportional to the actual arc voltage is applied to the inverting input of this operational amplifier.

The actual arc voltage is sensed at terminals 67 and 21A. Terminal 67 is connected to the electrode contact block, which is the point at which welding current is introduced to the conductor cable going to the welding gun. Terminal 21A can be connected to terminal 21 which is in turn connected to the "work" stud on the arc welding power source. For a more precise arc voltage measurement, jack J1 can be used and an auxiliary cable (not shown) run from this jack to the workpiece itself. This avoids inclusion in the sensed arc voltage of the voltage drop due to resistance losses in the welding cable from the work stud to the workpiece.

The insertion of a plug connected to this auxiliary cable in jack J1 automatically disconnects terminal 21.

Switch SW8 is a simple two pole, double throw, reversing switch. This is used because the voltage applied between points 667 and 510 must always be a constant polarity.

The arc voltage applied to terminals 667 and 510 is fed to voltage divider R501, R502, R503 which divides the arc voltage by ten, supplying a signal voltage proportional to actual arc voltage. Capacitor C501 filters the arc voltage, which is inherently noisy. Diode D502 provides protection to the control circuitry should the wrong polarity voltage be accidentally applied to terminals 667 and 510.

The signal voltage derived from the voltage divider is applied to the non-inverting input of operational amplifier 562. Again, this operational amplifier functions as a unity-gain amplifier and signal buffer.

The output of operational amplifier 562, $V_A$, is applied to resistor R504 and capacitor C504, which filter $V_A$ and apply the filtered value to operational amplifier 569, which in turn supplies the meter circuit. Filtering is necessary to facilitate reading of an inherently noisy signal on a digital meter.

The output of operational amplifier 562, $V_A$, is supplied through resistors R507, R535 to the inverting input of operational amplifier 561. Operational amplifier 561 compares signals $V_S$ and $V_A$.

A feedback path comprised of resistors R509, R510 and capacitors C507, C508, C518, connects the output of operational amplifier 561 to its inverting input. This feedback loop determines the gain of the operational amplifier stage. For high frequency noise signals, C507 provides a feedback path of negligible impedance back to the inverting input. As the gain of the operational amplifier is determined by dividing the feedback impedance by the input impedance, the gain of operational amplifier 561 (for noise) will be extremely low.

For extremely low frequency signals, e.g. a change in the set voltage signal ($V_S$), the feedback impedance will be the sum of resistor R510 and resistor R509. As resistor R509 is of a relatively high value, the amplifier gain for this type of voltage change will be very high and the output voltage swing of operational amplifier 561 in response to this type of change will be considerable. For signals falling between these two extremes in frequency, e.g. dynamic changes or oscillations in weld voltage due to power sources and arc characteristics, capacitors C508, C518 will bypass R509 and the feedback impedance will be essentially the value of R510. With the resistor values selected for the preferred embodiment, this will provide a gain of approximately 4.7, which is much lower than the DC gain provided by R509, and is much higher than the noise-gain limited by C507.

The output of operational amplifier 561 is connected to the base of transistor Q501. Diode D506 assures that the output of operational amplifier 561 cannot assume a large negative value with respect to the zero reference at terminal 510. This also protects the base-emitter junction of Q501 from reverse-bias voltage which could destroy the transistor. Capacitor C514 provides noise and transient immunity for Q501.

A jumper, indicated at pins F and S, is provided to remove resistor R507 from the input path of operational amplifier 561. This will increase the gain of operational amplifier 561 and thereby increase system response.

A second jumper, indicated at pins L, M and N is provided to add a filter circuit between operational amplifier 561 and transistor Q501. When connected as shown, pin L is shorted to pin M and the filter is removed from the circuit.

When fast responding, solid-state power sources are used with the subject welding system, filtering is desirable at this point in the circuit. The jumper is then switched to connect pins M and N instead of L and M, and resistor R511 and capacitor C702 filter the signal applied to the base of Q501.

At the start of welding, the time constant of this filter is lowered by adding resistor R704 to the filter in parallel with R511. Terminal 550 (FIG. 8) is held at a low voltage until welding current is flowing. This holds the voltage at the base of Q701 low and the transistor is turned off. Resistor R705 biases the gate of field-effect transistor Q702 such that Q702 is turned on and R704 is paralleled with R511 in the filter circuit. Once welding current starts to flow, a timing and bias circuit composed of resistors R701, R702, R703, capacitor C701 and zener diode DZ701 will begin its cycle. Capacitor C701 will have charged for approximately 0.5 seconds when DZ701 breaks down. This will turn on transistor Q701 and turn off Q702, removing R704 from the filter circuit. Diodes D701, D702 provide isolation and diode D703 protects the base-emitter junction of Q701.

As the output voltage of operational amplifier 561 increases, the base-emitter junction of Q501 becomes more forward biased and the Q501 collector current increases. The collector of Q501 is connected to the cathode terminal of a light-emitting diode in an optically-coupled isolator OCI501. This provides isolation between the voltage control circuitry of the wire feeder and the control circuitry of the associated arc welding power source (not shown). As the current through Q501 increases, the light emitted from the light-emitting diode will also increase and will in turn increase the current flow through the collector-emitter junction of the phototransistor of OCI501. Resistor R512 and potentiometer R561 sets the current through transistor Q501 and the light emitting diode of OCI501 for a given output level of operational amplifier 561.

Resistor R513 shunts the base-emitter junction of the phototransistor to reduce high-temperature leakage currents and to help linearize the gain of the optically-coupled transistor over a wider range of currents.

Terminals A, B and C connect to three terminals on the arc welding power source. These three terminals on appropriate arc welding power sources control the arc voltage in response to the input supplied by the voltage control circuitry. As these three inputs on most power sources are designed to control the output voltage in response to the resistance of a three-terminal potentiometer, the output at terminals A, B and C is designed to closely resemble the configuration of a control potentiometer. Thus, as the output voltage of operational amplifier 561 increases (demanding increased arc voltage), the effective resistance seen between terminals B and C will decrease, closely resembling the action of a control potentiometer.

R533 is provided to complete the "simulated potentiometer". C509, R534, and DZ504 provide noise immunity and protect transistor 564 from transient and reverse voltages that may appear at terminals A, B, and C.

In the control circuit so far described, prior to the start of welding, the contactor in the welding power source will be open and the actual arc voltage ($V_A$) (typically zero) will be substantially less than the arc voltage selected by the user ($V_S$). The voltage control circuit will attempt to raise the actual voltage by driving the output transistor 564, into the full-on state. Therefore, when trigger switch SW7 is closed to start welding and relay CR101 becomes energized, closing the contactor in the welding power source, full output power would be supplied to the electrode. A lower output voltage at the start of welding is more desirable. Circuitry is provided for holding the voltage control output to a low level prior to the closing of the power source output contactor.

THE HOLD LOW CIRCUIT

As seen in FIG. 7, resistors R530 and R538 and diode D503 form a voltage divider between the 14.5 volt supply terminal 525 and the zero reference terminal 510. The more positive side of resistor R538 is connected to the base of transistor Q504. Capacitor C502 provides transient protection and noise immunity for transistor Q504. The emitter of Q504 is connected directly to zero reference terminal 510. Therefore, prior to the start of welding, Q504 is turned on. The non-inverting input of operational amplifier 568 is connected to capacitor C505 and the collector of Q504, and with this transistor turned on, will be held to, at most, 0.2 V above the zero reference level.

Resistor R506 connects the output of operational amplifier 561 to the inverting input of operational amplifier 568. The inverting input of operational amplifier 568 is also connected through diode D504 to the zero reference terminal 510. The inverting input of operational amplifier 568 will closely follow the output of operational amplifier 561 until diode D504 saturates at approximately 0.6 V. Operational amplifier 568 will compare the output of operational amplifier 561 to the very low voltage at C505 when trigger SW7 is open. The output of operational amplifier 568 is connected through diode D505 to the non-inverting input of operational amplifier 561, which normally sees the desired arc voltage selected by the user ($V_S$). Operational amplifier 568 will develop an output sufficiently low to keep the voltage at its inverting input comparable to the voltage at its non-inverting input. Current will flow out of operational amplifier 560, through resistor R508 and diode D505, and into the output of operational amplifier 568. The voltage drop created across R508 will make the reference level present at the non-inverting input of operational amplifier 561 appear to represent a setting of nearly zero arc volts. Therefore, the voltage control circuit output is held low when trigger SW7 is open.

When the trigger is pulled, SW7 is closed, the CR601 relay contacts close, and terminals 524 and 530 are connected to the −10 volt terminal, 500. Terminal 530 is connected through isolation diode D516 to the voltage divider supplying the base of Q504. With terminal 530 connected to the −10 volt terminal, base drive is removed from Q504 and Q504 turns off. The voltage at the positive terminal of C505 will then be determined by voltage divider R505 and R532 connected between terminal 667 and the zero reference terminal 510. Resistors R505, R532 have been selected so that approximately 45% of the arc voltage is applied to C505. As long as this voltage is less than the forward voltage drop across D504, $V_S$ will appear to be nearly zero volts at the non-inverting input of operational amplifier 561 and the output of operational amplifier 561 will be held low. When the voltage across C505 exceeds that across D504, the output of operational amplifier 568 will rise quickly, diode D505 will become reverse biased, and the hold low circuit will be effectively disconnected from the input of operational amplifier 561, allowing the non-inverting input of 561 to "see" the desired arc voltage selected by the user ($V_S$). The output voltage of the power source will be permitted to rise to make $V_A$ equal to $V_S$, at the rate controlled by the frequency response of operational amplifier 561, previously discussed, in conjunction with the response of the welding power source.

Capacitor C506 phase compensates operational amplifier 568 to prevent instability and uncontrolled oscillation at the output of 568. Zener diode DZ503 provides reverse voltage protection for operational amplifier 568 and over-voltage protection for capacitor C505, transistor Q504, and operational amplifier 568.

PROTECTION CIRCUIT

Because arc welders are capable of producing high currents and high voltages, protection circuitry which will shut off the wire feed motor and the arc welding power source output when undesired conditions are encountered is necessary. Circuitry which will stop the wire feed and remove welding power from the electrode under certain predetermined conditions is described below.

OUT OF RANGE PROTECTION

If, for any reason, while welding, the arc welding power source cannot supply the voltage preset into the control circuit, it is desired that the wire feed mechanism and the power source be shut down. This type of situation can arise when the wire feeder voltage control circuits are incorrectly connected, the arc welding power source is set in the wrong range or polarity for the voltage desired, the work voltage sensing lead is disconnected, or in a number of other related circumstances requiring shut down of the welding process.

Figure 8:
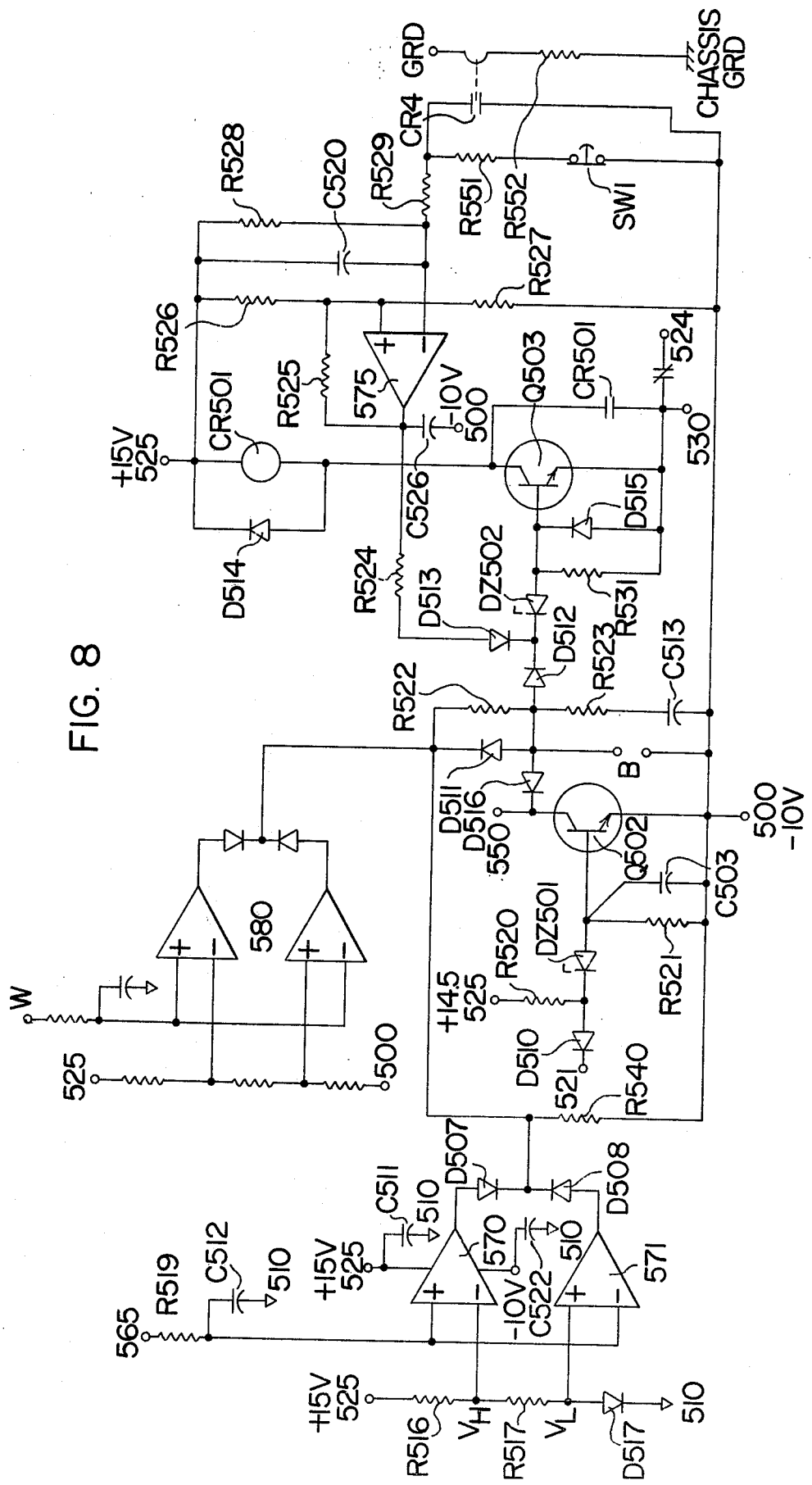
FIG. 8 is a schematic of the protection circuits used in the preferred embodiment.

Under these conditions, operational amplifier 561 (seen in FIG. 7) will attempt to drive transistor Q501 either fully on or fully off to supply the voltage desired. In either case, the operational amplifier output will go to one of its supply voltage limits. As seen in FIG. 8, this output voltage is supplied at terminal 565 through resistor R519 to capacitor C512, which will slightly filter this voltage. The voltage across capacitor C512 is supplied to the non-inverting input of operational amplifier 570 and to the inverting input of operational amplifier 571.

The limits at which shut down is desired are set by means of a voltage divider comprised of resistors R516, R517 and diode D517. The lower limit ($V_L$) is connected to the non-inverting input of operational amplifier 571. The upper limit ($V_H$) is supplied to the inverting input of operational amplifier 570. This configuration is known as a window comparator.

When the voltage across capacitor C512 lies between the two limiting voltages, the inverting input of operational amplifier 571 will be higher than its non-inverting input ($V_L$) and the output of the amplifier will be negative, or nearly the potential of the −10 volt 500 bus. Also, under the same circumstances, the non-inverting input of operational amplifier 570 will be lower than the inverting input, ($V_H$), resulting in a negative output for operational amplifier 570, or nearly the potential of the −10 volt 500 bus.

However, should the voltage across capacitor C512 fall below the lower limit voltage, the voltage at the inverting input of operational amplifier 571 will be lower than the voltage at the non-inverting input. This will result in a positive output voltage, forward biasing diode D508 and supplying current through resistors R522, R523 to timing capacitor C513. The time delay developed by the resistors and C513 prevents shut down due to momentary out-of-range conditions. When current has flowed for a time sufficient to charge C513 to nominally 15 volts, zener diode DZ502 will break down, supplying bias current to the base of transistor Q503, forward biasing this transistor and allowing current to flow through control relay coil CR501. This in turn will open the normally closed contact CR501 (in the relay switching circuit) which will interrupt current to the coil of CR101, turning off the arc welding power source and reversing the polarity of the voltage to the wire feed motor field winding, 121. Because the normally closed contact of CR501 is open, terminal 524 is held at a high potential. This reverse biases diodes D201 and D203 (FIG. 3) and allows current from the 14.5 V terminal 525, flowing through resistors R213, R223, to turn transistors Q201, Q202 on. With Q202 on, the non-inverting input of operational amplifier 283 is connected through resistor R225 to the −10 V terminal. This immediately interrupts power to the wire feed motor armature 110 by calling for a negative wire feed speed.

If the voltage across capacitor C512 exceeds the upper limit voltage ($V_H$), operational amplifier 570 will have a positive output and diode D507 will be forward biased. Timing capacitor C513 will charge and the welding system will be shut down in a manner identical to that described for a voltage below the lower limit voltage ($V_L$).

When Q201 is turned on, capacitor C207 discharges through R216 and is prepared for the next starting operation.

Zener diode DZ201 provides a threshold voltage which must be reached before Q202 will turn on, preventing nuisance shutdown of the wire feeder due to spurious signals from the switching circuit. Resistors R215 and R224 prevent leakage current from turning Q201 or Q202 on when they should be off. C222 provides transient protection for transistor Q202. Diodes D201 and D203 provide isolation for transistors Q201 and Q202. Diode D202 prevents excessive reverse current through the base-emitter circuit of Q201.

The normally open contacts of control relay CR501 are connected in parallel with the collector-emitter junction of transistor Q503, thereby latching this protection circuit into the shutdown state as long as the trigger SW7 is held closed.

Welding can be restarted after trigger SW7 is released. This will open contacts CR601 in the relay switching circuit, breaking the connection between terminal 530 and the −10 volt terminal 500 and thus interrupting current through control relay coil 501. If the interlock switch SW2 is in the on position, the interlock feature will be turned off when welding current is interrupted and current reed switch CR2 is opened. In either case, trigger release returns the welding system to normal conditions.

A second window comparator 580 is shown in FIG. 8. This comparator would be used when the wire feed speed is normally read directly from the wire rather than the drive motor. This comparator is connected to terminal W (FIG. 3) and will provide out-of-range protection for wire feed speed in a manner identical to that of the voltage out-of-range protection. The component values are chosen in an identical manner to that of the voltage out-of-range circuit to provide appropriate range limits and input filtering.

Diode D515 protects the base-emitter junction of transistor Q503 from reverse-bias voltage. Resistor R531 prevents leakage current from turning Q503 on when it should be off. Diode D511 and resistor R540 provide a discharge path from C513 to terminal 500 to prevent the accumulation of charge on C513 resulting from momentary out-of-range conditions that could lead to nuisance shutdowns.

During normal loading or "inching" of welding electrode, the arc voltage signal, $V_A$, may not equal $V_S$ and could cause the protection circuit to prevent electrode feeding. However, circuitry is provided to disable the protection circuitry until welding current is flowing. The base of transistor Q502 is connected through zener diode DZ501 and resistor R520 to the +14.5 V terminal 525. The emitter of the transistor is connected to the −10 volt terminal 500. Therefore, transistor Q502 conducts, preventing capacitor C513 from charging to the voltage necessary to break down zener diode DZ502. Transistor Q503 cannot become forward biased and the protection circuit is disabled.

Once welding current is flowing, interlock reed switch CR2 will close, supplying base current to transistor Q102 in the relay switching circuit, as previously discussed. This will turn transistor Q102 on, effectively connecting terminal 521 to the −10 volt bus 500. Diode D510 will then be forward biased and current will flow from resistor R520 through transistor Q102, instead of through zener diode DZ501. Transistor Q502 will be turned off, terminal 550 will be disconnected from the −10 volt terminal and the protection circuit will be enabled.

R521 and C503 provide transient and leakage protection for transistor Q502. Jumper terminals B, at transistor Q502, allow the protection circuitry to be bypassed for trouble-shooting or diagnostic purposes.

GROUNDING LEAD PROTECTION

A grounding lead connects the chassis ground of the wire feeder to the frame of the power source. If this frame is electrically common with the work ground, it would be possible to strike an arc between the electrode and the chassis of the wire feed mechanism and carry full welding current through the grounding lead. As the grounding lead is not designed to carry welding current, it will quickly overheat, and be damaged or even burn up. Therefore, a protection circuit is provided.

Under normal conditions, resistors R528, R529, R551 form a voltage divider applying about +3 volts with respect to the zero reference point, 510, to the inverting input of operational amplifier 575. Similarly, in the steady state, resistors R525, R526, R527 act as a voltage divider to apply −6 volts to the non-inverting input of operational amplifier 575. With these voltage levels, the output of the operational amplifier will be full negative and diode D513 will be reverse biased, so no current will flow through R524. Should sufficient current flow through the grounding lead and its limiting resistor R552, reed switch CR4 will close, bypassing resistor R551. The voltage at the inverting input of operational amplifier 575 will begin to drop at a rate determined by capacitor C520 and resistors R528, R529. The value at the inverting input will drop lower than −6 volts in about 5 milliseconds. When this occurs, the output of operational amplifier 575 will switch to a high state and, because of the positive feedback resistor R525, the voltage at the non-inverting input of the operational amplifier will rise to about +11 volts. Current will flow through resistor R524, forward biasing diode D513 and breaking down zener diode DZ502. This will forward bias transistor Q503, which in turn will stop wire feed and remove welding power from the electrode as previously described.

This grounding lead protection circuit differs from the out-of-range protection circuit in that it latches itself in the state which disables the wire feed motor and arc welding power supply and cannot be reset by releasing the gun trigger switch. Because of feedback resistor R525, the voltage control and wire feed remain disabled even after current through the grounding lead ceases and reed switch CR4 opens. (The voltage at the non-inverting input of operational amplifier 575 will be held higher than the voltage at the inverting input. Therefore, the output will remain high and welding cannot be recommenced.).

Reset switch SW1 must be momentarily pressed to reset the circuit. When SW1 is depressed, resistor R551 is disconnected from the −10 volt terminal and capacitor C520 will discharge through resistor R528, raising the inverting input of operational amplifier 575 to the full +14.5 volts which will swing the output of the amplifier low again, resetting the protection circuit.

Because the operator must depress reset switch SW1 after the grounding lead protection circuit has been tripped, an indication is provided that excessive current has been conducted by the grounding lead and the operator is informed that a safety check of the equipment should be undertaken.

OPERATION

In operation, the user, by manually adjusting speed set potentiometer R2 and observing the meter, is able to preset the desired wire feed speed to an exact value predetermined either in laboratory tests, by his supervisor, or by earlier welding operations. Then he moves meter circuit switch SW5 to the volts position and by adjusting voltage set potentiometer R3, presets the desired arc voltage to an exact value predetermined by the same laboratory tests, previous welds or by his supervisor.

Thereafter, all the user must do is to close trigger switch SW7 on the welding gun and the wire feed motor is energized in a manner to accelerate at a controlled rate to the desired preset speed. At the same time, the power source is energized and its output is controlled to provide the preset arc voltage. In both cases, the user is assured that the preset wire feed speed and preset arc voltage will be obtained and held. If the power source is misadjusted so that it is unable to reach the preset arc voltage or exceeds same, the machine will shut down after a predetermined time period. If, for some reason or other, excessive currents flow via the grounding lead to the chassis, the machine will be shut down. Once the trigger switch SW7 is pressed and welding has begun, the operator may release the trigger switch to stop welding. If interlock switch SW3 of relay switching circuit is closed, SW7 can be released and welding will continue until the gun is pulled away from the workpiece, breaking the arc and shutting off the machine.

ADDITIONAL NOISE PROTECTION

Capacitors C212, C213, C217 through C227, C526, C527, C528, C529 and several other small-value capacitors have been added to the circuitry to provide noise and transient protection. It has been found that integrated circuit packages connected to leads which leave a printed circuit board require this extra protection. If different integrated circuit arrangements are used to build the circuits described herein, appropriate noise protection will be required.

CIRCUIT ELEMENTS

Preferred values and designations for the elements of the described embodiment are listed below.

INTEGRATED CIRCUITS AND SPECIAL DEVICES

| | | |
|---|---|---|
| IC1 | MC1723L | DM1 AD8864 |
| IC2 | LM2907N | Wire Feed Speed Pick-Up (161) TIL148 |
| IC3 | MC78M05CT | OCI501 SOC124A |

All Operational Amplifiers MLM2902 (4 to a Package)

CAPACITORS (uf = microfarads) (pf = picofarads)

RESISTORS values in ohms

MOTOR POWER CIRCUIT, POWER SUPPLY, SPEED PICK-UP (FIG. 2)

| | | | |
|---|---|---|---|
| C101 | 0.005uf | R103 | 2 (50 watts) |
| C105 | 0.01 uf (FIG. 4) | R117 | 40 (12 watts) |
| C113 | 0.047uf | R118 | 100k |
| C114 | 0.047uf | R137 | 330 |
| C119 | 50uf | R150 | 1k |
| C130 | 0.15uf | R153 | 2.94k (1%) |
| C136 | 150uf | R154 | 1.00k (1%) |
| C143 | 39uf | R155 | 500 |
| C144 | 4.7uf | R166 | 1k |
| C151 | 0.022uf | R167 | 68k |
| C152 | 0.022uf | R168 | 39k |
| C157 | 18uf | R169 | 1.3k |
| SCR108 | 12A, 400V | Diodes | |
| SCR109 | 12A, 400V | D106 | 16A, 400V |
| Zener Diodes | | D107 | 16A, 400V |
| DZ138 | 15V, 5W | D115 | 16A, 400V |
| DZ139 | 10V, 5W | D122 | 1A, 1000V |
| | | D123 | 1A, 1000V |
| Transistors | | D601 | 1A, 600V |
| Q135 | 2N5655 | D602 | 1A, 600V |
| Q164 | 2N4123 | D603 | 1A, 600V |
| Fuse | | | |
| 116 ⅛ A S.B. | | D604 | 1A, 600V |
| Transient Protector | | All other diodes 1A, 400V | |
| TP104 150V MOV | | | |

WIRE FEED CONTROL AND PUT TRIGGERING CIRCUIT (FIGS. 3 & 4)

| | | | |
|---|---|---|---|
| | | R2 | 10K (2 watts) |
| C205 | 0.0033uf | R206 | 15K |
| C206 | 0.47uf | R207 | 10K |
| C207 | 18uf | R208 | 100K |
| C208 | 4uf | R209 | 33K |
| C209 | 0.047uf | R210 | 10K |
| C210 | 4.7uf | R211 | 5.6K |
| C211 | 0.15uf | R212 | 15K |
| C212 | 0.022uf | R213 | 47K |
| C213 | 0.022uf | R214 | 15K |
| | | R215 | 100K |
| C215 | 18uf | R216 | 1K |
| C216 | 100pf | R217 | 1K |
| C217 thru | 0.022uf | R218 | 1K |
| | | R219 | 22K |
| C227 | 0.022uf | R220 | 50K |
| | | R221 | 15K |
| Zener Diodes | | R222 | 10K |
| DZ201 | 6.8V | R223 | 33K |
| | | R224 | 100K |
| Transistors | | R225 | 1K |
| Q201 | 2N4123 | R226 | 10K |
| Q202 | 2N4123 | R227 | 6.8K |
| Q203 | 2N4123 | R228 | 10K |
| Q204 | 2N4125 | R229 | 20K |
| Q205 | 2N4123 | R230 | 27K |
| Q206 | 2N4123 | R231 | 15 |
| QU201 | 2N6027 | R232 | 100 |
| Diodes | | R233 | 6.8K |
| D201 thru | | R234 | 2.7K |
| | | R235 | 10K |
| D206 | 1A, 400V | R236 | 15K |
| D208 | 1A, 400V | R237 | 10K |
| | | R238 | 1M |
| | | R239 | 15K |
| | | R240 | 3.3K |
| | | R241 22K R242 560 | |

VOLTAGE CONTROL AND PROTECTION CIRCUITS (FIGS. 7 & 8)

| | | | |
|---|---|---|---|
| C501 | 0.1uf | R3 | 10K (2 watts) |
| C502 | 0.022uf | R501 | 44.2K (1%) |
| C503 | 0.022uf | R502 | 500 |
| C504 | 4.0uf | R503 | 4.75K (1%) |
| C505 | 0.47uf | R504 | 100K |
| C506 | 0.022uf | R505 | 22K |
| C507 | 0.022uf | R506 | 10K |
| C508 | 39uf | R507 | 10K |
| C509 | 0.022uf | R508 | 2.2K |
| C510 | 1.8uf | R509 | 2.7M |
| C511 | 0.022uf | R510 | 4.7K |
| C512 | 4.7uf | R511 | 10K |
| C513 | 50uf | R512 | 680 |
| C514 | 0.022uf | R513 | 2.7M |
| C515 | 0.022uf | R514 | 5.6K |
| C518 | 39uf | R515 | 1.8K |
| C520 | 1uf | R516 | 6.8K |
| C522 | 0.022uf | R517 | 27K |
| C523 | 0.022uf | R519 | 10K |
| C524 | 4.7uf | R520 | 33K |
| C526 | 0.005uf | R521 | 100K |
| C527 | 0.022uf | R522 | 15K |
| C528 | 0.022uf | R523 | 1K |
| C529 | 0.005uf | R524 | 4.7K |
| Transistors | | R525 | 4.7K |
| Q501 | 2N4123 | R526 | 22K |
| Q502 | 2N4123 | R527 | 22K |
| Q503 | 2N5655 | R528 | 22K |
| Q504 | 2N4123 | R529 | 2.2K |
| | | R530 | 33K |
| Zener Diodes | | R531 | 100K |
| | | R532 | 27K |
| DZ501 | 6.8V | R533 | 10K |
| DZ502 | 15V 1 watt | R534 | 100 |
| DZ503 | 10V | R535 | 1K |
| DZ504 | 20V 1 watt | R538 | 100K |
| Diodes | | R539 | 27K |
| D 501 | | R540 | 15K |
| thru | | R551 | 22K |
| D 518 | 1A, 400V | R552 | 0.1 |
| | | R561 | 2K |

RELAY SWITCHING CIRCUIT (FIG. 5)

| | | | |
|---|---|---|---|
| C104 | 0.022uf | R104 | 1K |
| C108 | 2.7uf | R105 | 10K |
| | | R106 | 100K |
| | | R107 | 10 |
| Transistor | | | |
| Q102 | 2N5655 | | |
| Diodes | | | |
| D509 | 1A, 400V | | |
| D111 | 1A, 400V | | |
| D112 | 1A, 400V | | |
| D113 | 1A, 400V | | |

METER CIRCUIT (FIG. 6)

| | | | |
|---|---|---|---|
| C401 | 500uf | R401 | 24.3K (1%) |
| C402 | 4.7uf | R402 | 2K |
| C403 | 0.022uf | R403 | 2.8K (1%) |
| C404 | 0.022uf | | |
| Diodes | | | |
| D401 | 1A, 400V | | |
| D402 | 1A, 400V | | |
| D403 | 1A, 400V | | |
| D404 | 1A, 400V | | |

START CIRCUIT (FIG. 7)

| | | | |
|---|---|---|---|
| C701 | 18uf | R701 | 27K |
| C702 | 39uf | R702 | 1K |
| Zener Diode | | R703 | 150K |
| DZ701 | 6.2V | R704 | 68 |
| Transistors | | R705 | 100K |
| Q701 | 2N4123 | | |
| Q702 | 2N4857 | | |

The invention has been described with reference to a preferred embodiment. Obviously, modifications and alternations will occur to other upon a reading and

Having thus described the invention, we now claim:

1. In an arc welding system:
   (a) a welding power source capable of supplying a controllable output voltage to a welding electrode, including control-signal sensitive means which vary the voltage of said power source in amounts proportional to a power source control signal applied to said means;
   (b) a welding electrode wire feeder including a motor driving feed rolls adapted to be in driving engagement with a welding electrode of indeterminate length;
   (c) first switch means;
   (d) first means operable when said first switch means is actuated to supply a signal to said power source control-signal sensitive means to cause said power source to energize said welding electrode;
   (e) second means operable when said first switch means is actuated to energize said motor to drive said feed rolls in an electrode feed direction;
   (f) first manually adjustable means providing a first reference signal for presetting a desired welding electrode voltage parameter for said power source;
   (g) visual means for setting said first manually adjustable means;
   (h) means sensing the actual value of said welding electrode voltage parameter and providing a signal proportional to said actual value;
   (i) first comparative means for comparing said signal proportional to said actual value and said first reference signal, generating a power source control signal and supplying said power source control signal to said control sensitive means;
   the improvement which comprises:
   (j) said visual means being a precise visual read-out electric meter precisely calibrated to display welding procedure parameters; and
   (k) said first manually adjustable means being a non-calibrated, non-precision type potentiometer providing said first reference signal to said meter proportional to said desired welding electrode voltage parameter such that said meter displays said desired parameter and enables the precise manual setting of said first reference signal with said non-precision poteniometer whereby said welding voltage parameter may be precisely present.

2. The improvement of claim 1 including:
   (l) second manually adjustable means comprised of a non-calibrated, non-precision type potentiometer providing a second reference signal to said precisely calibrated meter proportional to said desired welding electrode feed speed in lineal units per unit of time such that said meter displays said desired welding electrode feed speed and enables the precise manual presetting of said second reference signal with said non-precision type potentiometer;
   (m) means sensing the actual speed of welding electrode feed and providing a signal proportional to said actual welding electrode feed speed in lineal units per unit of time;
   (n) second comparative means for comparing said signal proportional to said actual welding electrode feed speed to said second reference signal and producing a signal to vary the energization of said motor; whereby said welding electrode feed speed may be precisely controlled and held to a required degree of equivalence with said second reference signal.

3. The improvement of claim 2 wherein means are provided for controlling and limiting the acceleration of said motor including means for summing and weighting said second reference signal and said signal proportional to said actual welding electrode feed speed and using the resultant sum to control the rate of rise of a substitute second reference signal supplied to said second comparative means whereby the rate of acceleration of said motor is controlled.

4. The improvement of claim 3 wherein said sum is supplied to a starting control means producing a controlled time varying signal output based on said sum; and selector means which substitute said controlled time varying signal output for said second reference signal in said second comparative means during starting operations and removes said time varying signal output from said second comparative means when said proportional wire feed signal reaches required equivalence to said second reference signal under steady-state operation.

5. The improvement of claim 4 wherein means are provided for substituting a signal corresponding to a zero or negative welding electrode feed speed for said second reference signal in second comparative means and simultaneously resetting said timing means to near zero upon reception of a signal from a circuit requiring machine shut down, or upon reception of a signal from a trigger circuit requiring zero electrode feed speed.

6. The improvement of claim 2 wherein means are provided for shutting down said welding electrode wire feeder and said power source output when said power source control signal differs above a preset high limit or below a preset low limit for a predetermined period of time and means for disabling said shut down means during inching and starting operations.

7. The improvement of claim 2 wherein third and fourth switch means are provided such that said desired welding electrode voltage parameter and said actual value of said welding electrode voltage parameter, said desired welding electrode feed speed and said actual welding electrode feed speed may be selectively displayed on the same meter.

8. The improvement of claim 7 wherein said meter is a digital meter.

9. The improvement of claim 1 wherein said welding system includes a grounding lead connecting the chassis of said welding wire electrode feeder to the grounded frame of said welding power source; detector means which senses when current on said grounding lead exceeds a predetermined limit; timing means which are engaged whenever said detector means senses excess current; electronic latching means responsive to said timing means producing an output signal after said timing means has completed its cycle and latching said output signal until said electronic latching means is manually reset; and means responsive to said output signal which interrupts welding power and stops electrode feed, 10. The improvement of claim 1 wherein means are provided for sensing said power source control signal in combination with timing means for stopping the welding system when said power source control signal exceeds a predetermined high level or a predetermined low level for a predetermined period of time.

11. The improvement of claim 1 wherein second switch means are provided such that said desired welding electrode voltage parameter and said actual value of said welding electrode voltage parameter may be selectively displayed on the same meter.

12. The improvement of claim 1 wherein hold low comparator means are provided, said comparator means having an output connected to said first comparative means and capable of substituting its output for said first reference signal, said hold low comparator means having a first input and a second input, said first input of said hold low comparator means sensing the output of said first comparative means, said second input of said hold low comparator means sensing said power source output and connected through clamping switch means to circuit ground potential, said clamping switch means being open when said first switch means is closed and said clamping switch being closed when said first switch means is open whereby said hold low comparator means will substitute a low signal for said first reference signal when said first switch means is open, or if said power source output is below a predetermined level if said first switch means is closed.

13. The improvement of claim 1 which further includes protection means monitoring said power source control signal, said protection means having a given high output when said power source control signal is not between preselected limits, a charging circuit connected to the output of said protection means, said charging circuit having a preselected charging rate when said protection means has a high output, a preselected discharge rate when said protection means has a low output and a threshold detector providing an output signal when said charging circuit is charged to a preselected level; and switch means responsive to said threshold detector, said switch means stopping the welding system.

14. The device of claim 13 including switch means discharging said charging circuit when closed whereby said protection means is disabled for starting.

* * * * *